(12) United States Patent
Shogaki et al.

(10) Patent No.: US 7,567,382 B2
(45) Date of Patent: Jul. 28, 2009

(54) OPTICAL FILTER

(75) Inventors: Tatsuya Shogaki, Kakogawa (JP); Hiroaki Matsui, Kakogawa (JP)

(73) Assignee: Daishinku Corporation, Kakogawa-Shi (JP)

( * ) Notice: Subject to any disclaimer, the term of this patent is extended or adjusted under 35 U.S.C. 154(b) by 268 days.

(21) Appl. No.: 10/581,248

(22) PCT Filed: Dec. 8, 2004

(86) PCT No.: PCT/JP2004/018298

§ 371 (c)(1),
(2), (4) Date: May 31, 2006

(87) PCT Pub. No.: WO2005/059610

PCT Pub. Date: Jun. 30, 2005

(65) Prior Publication Data

US 2007/0121042 A1    May 31, 2007

(30) Foreign Application Priority Data

Dec. 18, 2003 (JP) .............................. 2003-420533

(51) Int. Cl.
  *G02B 5/30* (2006.01)
  *G02B 27/28* (2006.01)
(52) U.S. Cl. ...................................... 359/497; 359/483

(58) Field of Classification Search ................. 359/497, 359/483
See application file for complete search history.

(56) References Cited

U.S. PATENT DOCUMENTS

| 5,863,457 A * | 1/1999 | Hasebe et al. ........... 252/299.01 |
| 2003/0025981 A1 * | 2/2003 | Ishikawa et al. ............. 359/290 |
| 2003/0218709 A1 * | 11/2003 | Ito et al. ..................... 349/117 |
| 2005/0040340 A1 * | 2/2005 | Morikawa et al. ........ 250/484.4 |

FOREIGN PATENT DOCUMENTS

| JP | 2001-228330 | 8/2001 |
| JP | 2001-272633 | 10/2001 |
| JP | 2002-123966 | 4/2002 |
| JP | 2002-287093 | 10/2002 |
| JP | 2002-373977 | 12/2002 |

* cited by examiner

*Primary Examiner*—Joshua L Pritchett
(74) *Attorney, Agent, or Firm*—Marvin A. Motsenbocker; Mots Law, PLLC

(57) ABSTRACT

An optical filter such that at least one optically anisotropic crystal plate and at least one substrate are stuck together in a state in which a principal face of the optically anisotropic crystal plate and a principal face of the substrate are perpendicular to a direction of transmission of a ray. Also, a substrate is used as end face on a ray incident side, and another optically anisotropic crystal plate or another substrate that is thinner than the substrate that is the end face on the ray incident side is stuck onto the substrate.

11 Claims, 9 Drawing Sheets optical filter

OPTICAL FILTER

TECHNICAL FIELD

The present invention relates to an optical filter such as a phase plate or an optical low pass filter used in any of a variety of optical devices.

BACKGROUND ART

Phase plates and optical low pass filters (crystal double refraction plates) have been used in the past in various optical devices as optical filters that change the optical characteristics of a ray transmitted by a crystal or other such optically anisotropic crystal plate. Of these, the phase plates are suited to polarizing optical systems such as liquid crystal projectors or pickups for optical disks, and are elements that get a phase between an ordinary ray and an extraordinary ray by utilizing a speed difference between the two rays in a crystal or other such optically anisotropic medium. When this is configured as a quarter-wave plate (the phase is configured at $\pi/2$), linearly polarized light is converted into circularly polarized light, or circularly polarized light is converted into linearly polarized light, as discussed above. An optical low pass filter (crystal double refraction plate) is suited to imaging devices such as video cameras and digital still cameras, and makes use of the double refraction effect of a crystal or other such optically anisotropic medium to separate incoming ray into an ordinary ray and an extraordinary ray before the exit ray, and therefore has the function of filtering out aliasing noises. The optical separation direction and separation width here can be suitably adjusted by means of specific parameters.

A phase plate will now be described as an example of an optical filter. In general, the thickness of a phase plate required to accommodate the wavelength band (such as around 600 nm) of the ray used in an optical device is theoretically about 15 to 20 μm in the case of a quarter-wave plate. However, difficulties in machining crystals make it hard to obtain a crystal plate of this thickness. Therefore, the general practice is to use two crystal plates that have been machined with a thickness difference of about the thickness mentioned above, and stick these two crystal plates together. That is, the difference in thickness between two crystal plates is utilized to simulate the same polarization performance as that of a crystal plate of the above-mentioned thickness (about 15 to 20 μm) (see Patent Document 1 below). An example of the constitution of a phase plate is one in which a crystal wavelength plate with a thickness of 517 μm and optical axis angle of 0° with respect to a reference plane (one side of a rectangular crystal plate) is stuck together with a crystal wavelength plate with a thickness of 500 μm and an optical axis angle of 90°, by means of a UV adhesive (a UV curing adhesive).

These optical filters composed of optically anisotropic crystal plates (phase plates and optical low pass filters) have become increasingly thin in response to the smaller size and higher performance of various optical devices in recent years. For instance, Patent Document 2 discloses that with a phase plate, if the thickness of a quarter-wave plate comprising an optically anisotropic crystal plate is at least 100 μm and no more than 500 μm, there will be a reduction in the dependence of the retardation value on the angle of incidence (the product of the thickness of the quarter-wave plate and the difference in the refractive index of the ordinary ray and extraordinary ray of the quarter-wave plate, that is, the difference in double refraction), and there will be an improvement in contrast performance when the phase plate is used in a reflection type of liquid crystal display device. Even with an optical low pass filter, as imaging elements such as CCDs become more compact and have higher pixel counts, the pixel pitch of these imaging elements is becoming smaller today, and there is a need for an optical low pass filter that is thinner so that there will be less separation width between the ordinary ray and extraordinary ray produced by double refraction of an optically anisotropic medium such as crystal, and the optical low pass filter will have a separation width corresponding to the pixel pitch of the above-mentioned imaging elements.

Patent Document 1: JP S58-194004A
Patent Document 2: JP 2003-222724A

Optical filters such as the above can be affected by the film stress of optical coating materials (antireflective films, infrared-cut coatings, UV-cut coatings, and so forth) formed on the front and back faces of the optical filter, causing the filter to warp or be distorted, and this problem with warping and distortion becomes more pronounced when the optical filter is made thinner as discussed above (see FIG. 11). Another problem is that a thinner optical filter is more susceptible to cracking, chipping, and so on.

Also, the coefficient of thermal expansion of an optically anisotropic crystal plate varies with the axial direction, so such a plate is susceptible to problems of warping and distortion. In particular, when an optical filter in which a plurality of optically anisotropic crystal plates are stuck together with an adhesive is affected by heat, the optically anisotropic crystal plates impart stress to each other depending on the axial direction, thickness, principal face size, principal face shape, and so forth of the optically anisotropic crystal plates, which makes such an optical filter more susceptible to warping and distortion. Furthermore, with an optical filter comprising a plurality of optically anisotropic crystal plates that are stuck together with a UV adhesive, if any heat is applied in subsequent manufacturing steps, slight relaxation may occur in the UV adhesive, and the stress produced in the UV adhesive by this relaxation interacts with the thermal stress of the individual optically anisotropic crystal plates, resulting in even more warping and distortion in the optical filter.

When warping or distortion thus occurs in an optical filter, it can change the optical incidence angle characteristics, or change the phase characteristics or double refraction characteristics, and these changes can have a detrimental effect on optical characteristics.

The present invention is conceived in light of this situation, and it is an object thereof to provide a more highly reliable optical filter that accommodates thinner optically anisotropic crystal plates, without adversely affecting optical characteristics through warping and distortion, or cracking and chipping of the optically anisotropic crystal plates.

BRIEF DESCRIPTION OF THE INVENTION

The present invention is an optical filter for varying the optical characteristics of a ray transmitted by an optically anisotropic crystal plate, wherein at least one optically anisotropic crystal plate and at least one substrate are stuck together in a state in which a principal face of the optically anisotropic crystal plate and a principal face of the substrate are perpendicular to the direction of transmission of the ray, and the optically anisotropic crystal plate or the substrate is used as an end face on a ray incident side (a principal face at one end of the optical filter), and another optically anisotropic crystal plate or another substrate that is thinner than the optically anisotropic crystal plate or the substrate that is the end face on the ray incident side is stuck onto the optically anisotropic crystal plate or the substrate.

The present invention is also an optical filter for varying the optical characteristics of a ray transmitted by an optically anisotropic crystal plate, wherein at least one optically anisotropic crystal plate and at least one substrate are stuck together in a state in which a principal face of the optically anisotropic crystal plate and a principal face of the substrate are perpendicular to the direction of transmission of the ray, and the optically anisotropic crystal plate or the substrate is used as an end face on a ray exit side, and another optically anisotropic crystal plate or another substrate that is thinner than the optically anisotropic crystal plate or the substrate that is the end face on the ray exit side is stuck onto the optically anisotropic crystal plate or the substrate.

The present invention is also an optical filter for varying the optical characteristics of a ray transmitted by an optically anisotropic crystal plate, wherein at least one optically anisotropic crystal plate and at least one substrate are stuck together in a state in which a principal face of the optically anisotropic crystal plate and a principal face of the substrate are perpendicular to the direction of transmission of the ray, the optically anisotropic crystal plate or the substrate is used as an end face on a ray incident side, and another optically anisotropic crystal plate or another substrate that is thinner than the optically anisotropic crystal plate or the substrate that is the end face on the ray incident side is stuck onto the optically anisotropic crystal plate or the substrate, and the optically anisotropic crystal plate or the substrate is used as an end face on a ray exit side, and another optically anisotropic crystal plate or another substrate that is thinner than the optically anisotropic crystal plate or the substrate that is the end face on the ray exit side is stuck onto the optically anisotropic crystal plate or the substrate.

In the above constitution, the substrate may be a glass substrate.

In the above constitution, the substrate may be used for both end principal faces of the optical filter, and a portion of the substrate may be given an optical coating.

In the above constitution, the substrate may be used for both end principal faces of the optical filter, and these substrates may have the same thickness.

In the above constitution, the optically anisotropic crystal plate and the substrate may be stuck together with a UV adhesive.

In the above constitution, the thickness of the UV adhesive may be set to be no more than 1/20 the thickness of at least one of the optically anisotropic crystal plate and the substrate.

In the above constitution, an amorphously bonded optical coating may be formed on the ray incident side end face and/or the exit side end face.

In the above constitution, the optical filter may be a phase plate wherein a plurality of optically anisotropic crystal plates of different thickness are layered over one another, an incoming ray is split into an ordinary ray and an extraordinary ray, and the optical characteristics of the incoming ray are varied by a phase between these two rays.

In the above constitution, the optical filter may be an optical low pass filter wherein an incoming ray is split into an ordinary ray and an extraordinary ray by an optically anisotropic crystal plate, and the optical characteristics of the incoming ray are varied by imparting specific optical separation direction and specific separation width between these two rays.

With the optical filter according to the present invention, at least one optically anisotropic crystal plate and at least one substrate are stuck together in a state in which a principal face of the optically anisotropic crystal plate and a principal face of the substrate are perpendicular to the direction of transmission of the ray, and the optically anisotropic crystal plate or the substrate is used as the end face on the ray incident side, and another optically anisotropic crystal plate or another substrate that is thinner than the optically anisotropic crystal plate or the substrate that is the end face on the ray incident side is stuck onto said optically anisotropic crystal plate or said substrate, so there is less warping or distortion of the optically anisotropic crystal plate due to external factors such as the effect of heat, an optical coating, or an adhesive, and warping or distortion caused by internal factors of the optically anisotropic crystal plate itself, occurring due to variance in polishing precision or the like, is also corrected, affording better parallelism and flatness of the principal faces of the optical filter. In other words, the angle of incidence of a ray incident on one of the principal faces of the optical filter (and particularly the end face on the incident side) will not be changed by warping or distortion. Accordingly, the desired phase characteristics and double refraction characteristics are obtained, and there is no adverse effect on optical characteristics. Also, since warping or distortion will have no effect even if the optically anisotropic crystal plate is made thinner, higher performance can be achieved. Also, since warping or distortion will have no effect even if the optically anisotropic crystal plate is made thinner, higher performance can be achieved.

Also, with the optical filter according to the present invention, at least one optically anisotropic crystal plate and at least one substrate are stuck together in a state in which a principal face of the optically anisotropic crystal plate and a principal face of the substrate are perpendicular to the direction of transmission of the ray, and the optically anisotropic crystal plate or the substrate is used as the end face on the ray exit side, and another optically anisotropic crystal plate or another substrate that is thinner than the optically anisotropic crystal plate or the substrate that is the end face on the ray exit side is stuck onto said optically anisotropic crystal plate or said substrate, so there is less warping or distortion of the optically anisotropic crystal plate due to external factors such as the effect of heat, an optical coating, or an adhesive, and warping or distortion caused by internal factors of the optically anisotropic crystal plate itself, occurring due to variance in polishing precision or the like, is also corrected, affording better parallelism and flatness of the principal faces of the optical filter.

An even more favorable effect will be realized by combining the above constitutions of the present invention.

Also, if thick substrates are applied so as to sandwich the principal faces at both ends of the optically anisotropic crystal substrate, not only will this increase the strength and rigidity of the optically anisotropic crystal substrate, but there will be no scratching of the principal faces of the optically anisotropic crystal substrate by external factors, or cracking and chipping of the optically anisotropic crystal plate. In particular, making an optically anisotropic crystal plate thinner can result in inadequate strength or rigidity, making the above damage even more pronounced, but the above constitution prevents this.

In addition to the effects described above, if a glass substrate is used, then this substrate will have no adverse effect on the phase characteristics or double refraction characteristics obtained with the optically anisotropic crystal plate. Also, since the coefficient of thermal expansion approximates that of the optically anisotropic crystal plate, no warping or distortion will occur in the optically anisotropic crystal plate as a result of a thermal effect, and a less expensive substrate can be obtained.

In addition to the effects described above, in the formation of an optical coating by vacuum vapor deposition, sputtering, or another such method, an optical coating can be formed on the substrate, which is relatively thick and unaffected by warping, distortion, or the like, rather than forming an optical coating on the optically anisotropic crystal plate, which is relatively thin and more readily affected by warping, distortion, or the like, so an optical filter can be provided without damage caused by distortion of the optically anisotropic crystal plate.

Just a portion of the substrate that is the principal faces at both ends of the optical filter (just one principal face of each substrate) is given an optical coating so as not to decrease the transmissivity of the optical filter, but since the optical coating is formed on the substrates, which are thicker than the optically anisotropic crystal plate, it is easier to tell the back from the front than when an optical coating is formed on the optically anisotropic crystal plate, so there is no confusing the planar direction of the optical coating in the sticking together of various kinds of optically anisotropic crystal plate or substrate.

In addition to the effects described above, since the substrates at the principal faces at both ends of the optical filter are of the same thickness, the ability of these substrates to suppress warping or distortion of the optically anisotropic crystal plate, and to correct warping or distortion of the optically anisotropic crystal plate, can be uniform at the principal faces at both ends of the optical filter, so the parallelism and flatness of the principal faces of the optical filter can be markedly improved.

In addition to the effects described above, if a UV adhesive (a UV curing adhesive) is used, an optical filter can be provided without any damage to the optically anisotropic crystal plate due to thermal distortion. Also, since a UV adhesive (a UV curing adhesive) has a short curing time, there will be less shifting or deformation during curing.

In addition to the effects described above, since the thickness of the UV adhesive is set to be no more than 1/20 the thickness of at least one of the optically anisotropic crystal plate and the substrate, it is possible to prevent deformation in the thickness direction of the substrate or crystal plate that would otherwise occur in the bonding of the substrate or crystal plate.

In addition to the effects described above, since an amorphously bonded optical coating is formed on the ray incident side end face and/or the exit side end face, there is greater stress in an infrared-cut coating, antireflective film, or the like, and the film is stronger. It is also possible to reduce change over time in an infrared-cut coating or antireflective film.

In addition to the effects described above, with a phase plate in which two optically anisotropic crystal plates are stuck together with an adhesive in different axial directions, the optically anisotropic crystal plates impart stress to each other, and the optical filter is susceptible to warping or distortion, but the optical filter can be used without being adversely affected by this warping or distortion. In particular, when a phase plate is used in a reflection type of liquid crystal display device, heat raises the temperature to around 80°, making the device more susceptible to the adverse effects of warping or distortion, but these problems can be ameliorated. Also, since there is no effect of warping or distortion, the phase plate can be made thinner, there is less dependence of the retardation value on the angle of incidence, and when the phase plate is used in a reflection type of liquid crystal display device, for example, there is an improvement in contrast performance.

In addition to the effects described above, with an optical low pass filter, the optical coating formed on an optically anisotropic crystal plate usually consists of more layers than an antireflective film such as an infrared-cut coating, UV-cut coating, or the like, so the optical coating makes the optical filter more susceptible to warping or distortion, but the optical low pass filter can be used without the adverse effects of this warping or distortion. Also, with an optical low pass filter comprising two or more optically anisotropic crystal plates that are stuck together with an adhesive in different axial directions, the optically anisotropic crystal plates impart stress to each other, and the optical filter is susceptible to warping or distortion, but the optical filter can be used without being adversely affected by this warping or distortion, so such an optical filter can be applied to the separation patterns and separation widths of a wide variety of imaging elements such as a CCD. Furthermore, since there is no effect of warping or distortion, the optical low pass filter portion can be made thinner, which is favorable in cases when imaging elements such as CCDs become more compact and have higher pixel counts and as a result, can be used in an imaging element with a small pixel pitch.

Figure 1:
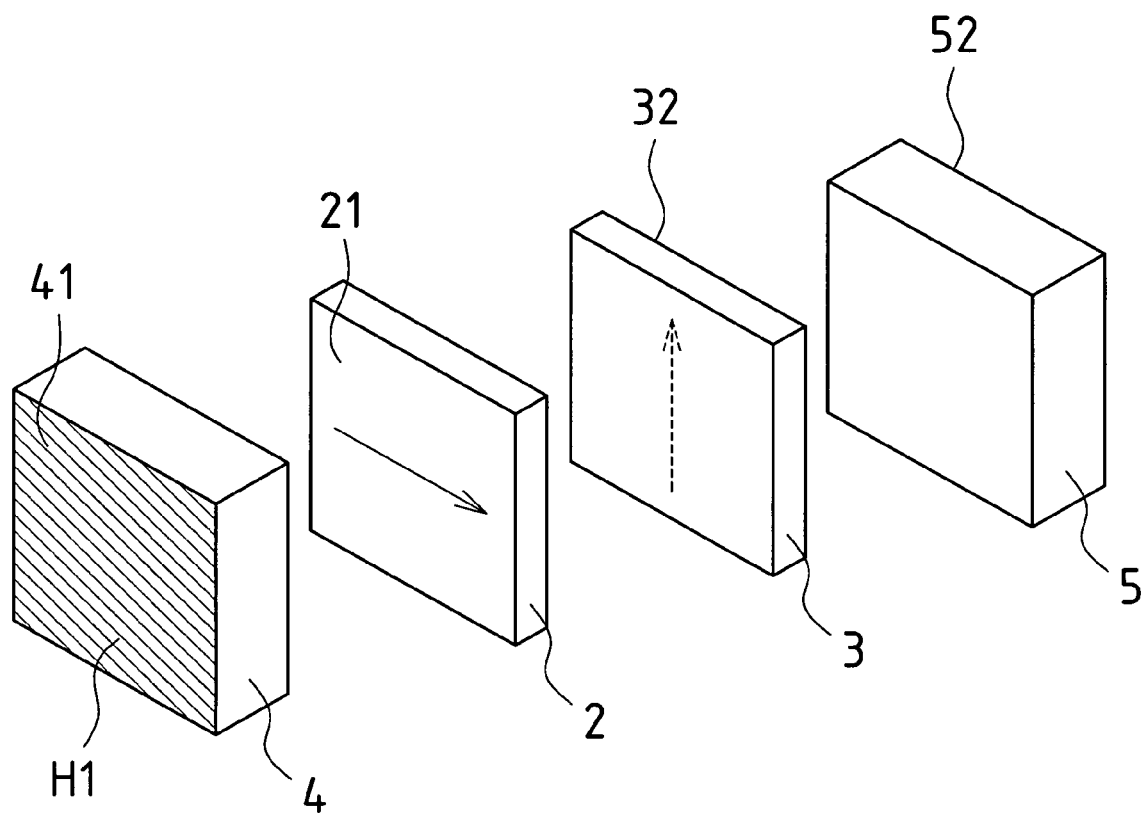
FIG. 1 is an exploded perspective view of a phase plate according to a first embodiment of the present invention.

DESCRIPTION OF REFERENCE NUMERALS 1, 6 optical filter
2, 3, 7 crystal plate (optically anisotropic crystal plate)
4, 5, 8, 9 glass substrate

DETAILED DESCRIPTION OF THE INVENTION

First Embodiment

Figure 2:
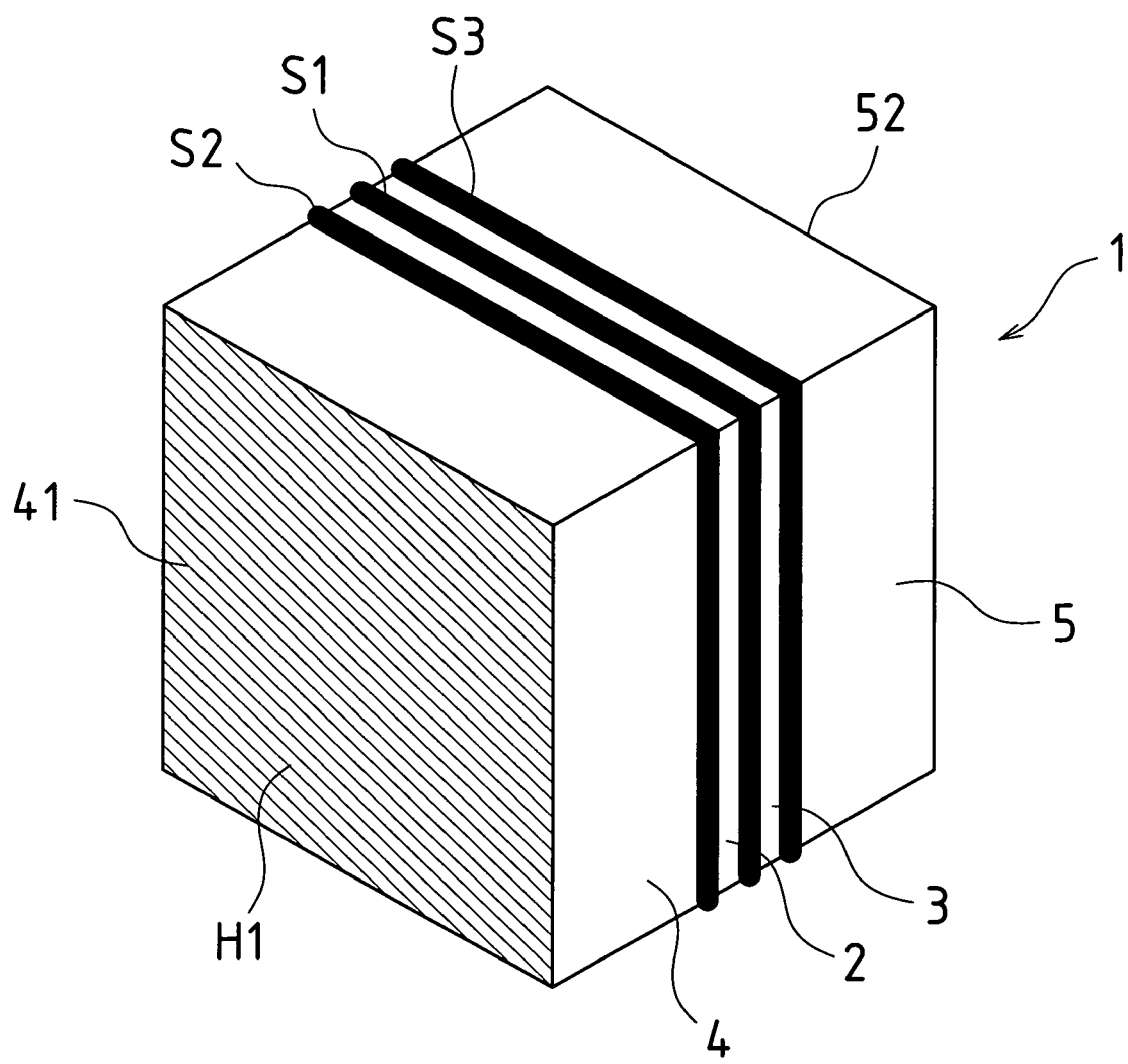
FIG. 2 is a perspective view of the assembled state in FIG. 1.
Figure 3:
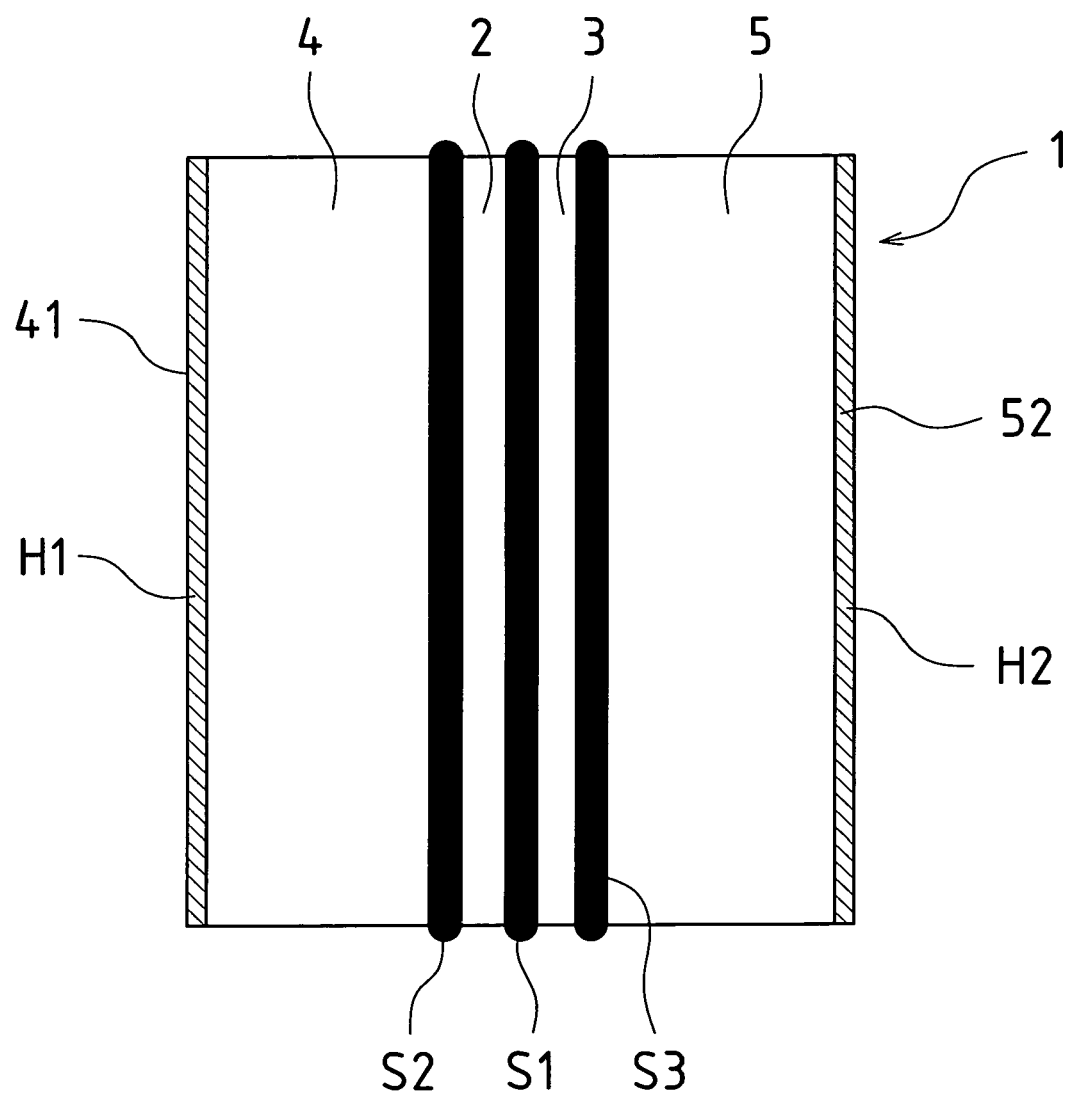
FIG. 3 is a side view of FIG. 2.

A first embodiment of the present invention will now be described, using a phase plate as an example, through reference to the drawings. FIG. 1 is an exploded perspective view of the phase plate according to this embodiment, FIG. 2 is a perspective view of the assembled state in FIG. 1, and FIG. 3 is a side view of FIG. 2.

As shown in these drawings, an optical filter 1 is constituted by two crystal plates (optically anisotropic crystal plates) 2 and 3, and glass substrates 4 and 5. This will now be described in more specific terms. Here, the front side in FIGS.

1 and 2 (the left side in FIG. 3) shall be the incident face (referred to as the incident side end face in the present invention), the crystal plate that is in the front is called a first crystal plate 2, the glass substrate that is in the front is called a first glass substrate 4, the back side (the right side in FIG. 3) shall be the exit face (referred to as the exit side end face in the present invention), the crystal plate that is in the back is called a second crystal plate 3, and the glass substrate that is in the back is called a second glass substrate 5.

The crystal plates 2 and 3 both have the same square shape when seen in plan view. The first crystal plate 2 has a thickness of 200 μm and an optical axis angle of 0° with respect to a reference plane (one side of a rectangular crystal plate). The second crystal plate 3 has a thickness of 215 μm and its optical axis angle is 90°. That is, this difference of 15 μm in thickness is utilized so as to simulate the performance (equivalent polarization performance) of a phase plate consisting of a single crystal plate with a thickness of 15 μm. This thickness difference is not limited to 15 μm, and is suitably set according to the incoming ray that is to be polarized. These first crystal plates 2 and 3 are stuck together with a UV adhesive S1 in a state in which their optical axis angles are perpendicular to each other. With a thin phase plate such as this, there is less dependence of the retardation value on the angle of incidence, and there is an improvement in contrast performance when the phase plate is used in a reflection type of liquid crystal display device, for example. The optical axis of the first crystal plate 2 is indicated with a solid line, while the optical axis of the second crystal plate 3 is indicated with a broken line.

This embodiment is characterized in that the glass substrates 4 and 5, which are thicker than these thin phase plates, are stuck to the principal faces at both ends of the phase plates in order to eliminate the effect of warping or distortion in these phase plates.

It is preferable for the glass substrates 4 and 5 to have substantially the same square shape as the above-mentioned crystal plates, and for their optical refractive index characteristics and coefficient of thermal expansion to approximate those of the above-mentioned crystal plates (optically anisotropic crystal plates). For example, these substrates can be made of siloca glass, sapphire glass, or white glass. The first glass substrate 4 has an antireflective film (optical coating) H1 formed on the incident face 41, and an antireflective film (optical coating) H2 formed on the exit face 52, and the glass substrates 4 and 5 are both set to the same thickness of 1000 μm. The above-mentioned antireflective films can be obtained by forming multiple layers of $SiO_2$, $TiO_2$, or another such dielectric thin film by vacuum vapor deposition or another such method. The first glass substrate 4 is stuck onto the incident face 21 of the first crystal plate 2 with a UV adhesive S2, and the second glass substrate 5 is stuck onto the exit face 32 of the second crystal plate 3 with a UV adhesive S3.

Since the glass substrates 4 and 5, which are thicker than the crystal plates, are stuck to the principal faces 21 and 32 at both ends of these crystal plates, no distortion occurs in the optical filter 1, and there is no change in the incidence angle, so the desired phase characteristics are obtained. Furthermore, these substrates not only increase the strength and rigidity of the optical filter 1, but also prevent the principal faces of the crystal plates from being scratched or chipped by external factors.

In the first embodiment given above, the example is of using crystal plates having optical axis angles of 0° and 90°, and having the angle formed by the two optical axes be 90°, but the optical axis angles need not be 0° and 90°, and the angle formed by the two optical axes may be set to less than 90°. Also, in the above first embodiment, a decrease in optical transmissivity is suppressed by forming antireflective films (optical coatings) only on the incident face 41 of the first glass substrate and the exit face 52 of the second glass substrate. However, these films may also be formed on the front and back principal faces of the glass substrates 4 and 5, and may be formed on the front and back principal faces of the crystal plates 2 and 3. Also, in the example given, the glass substrates 4 and 5 both had the same thickness and the same material, but as long as distortion can be eliminated from the crystal plates (optically anisotropic crystal plates), they may have mutually different thicknesses and different materials.

Second Embodiment

Figure 4:
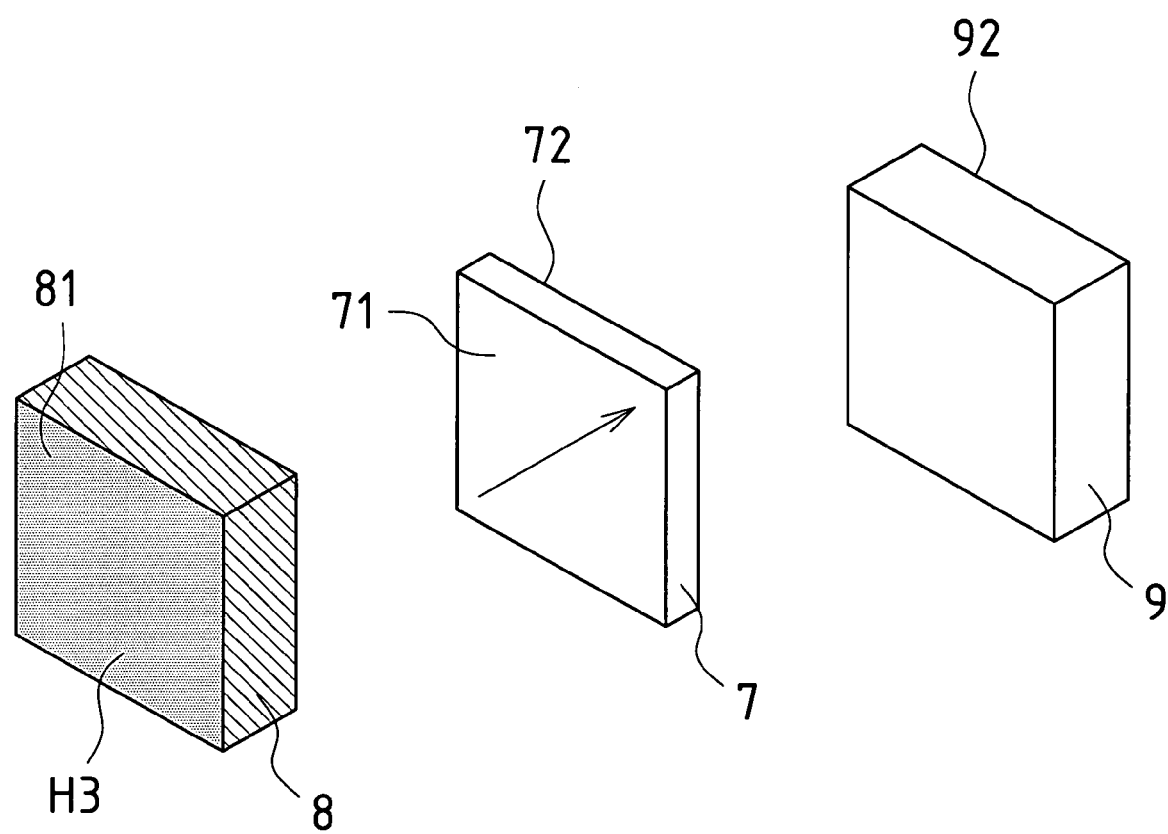
FIG. 4 is an exploded perspective view of an optical low pass filter according to a second embodiment of the present invention.
Figure 5:
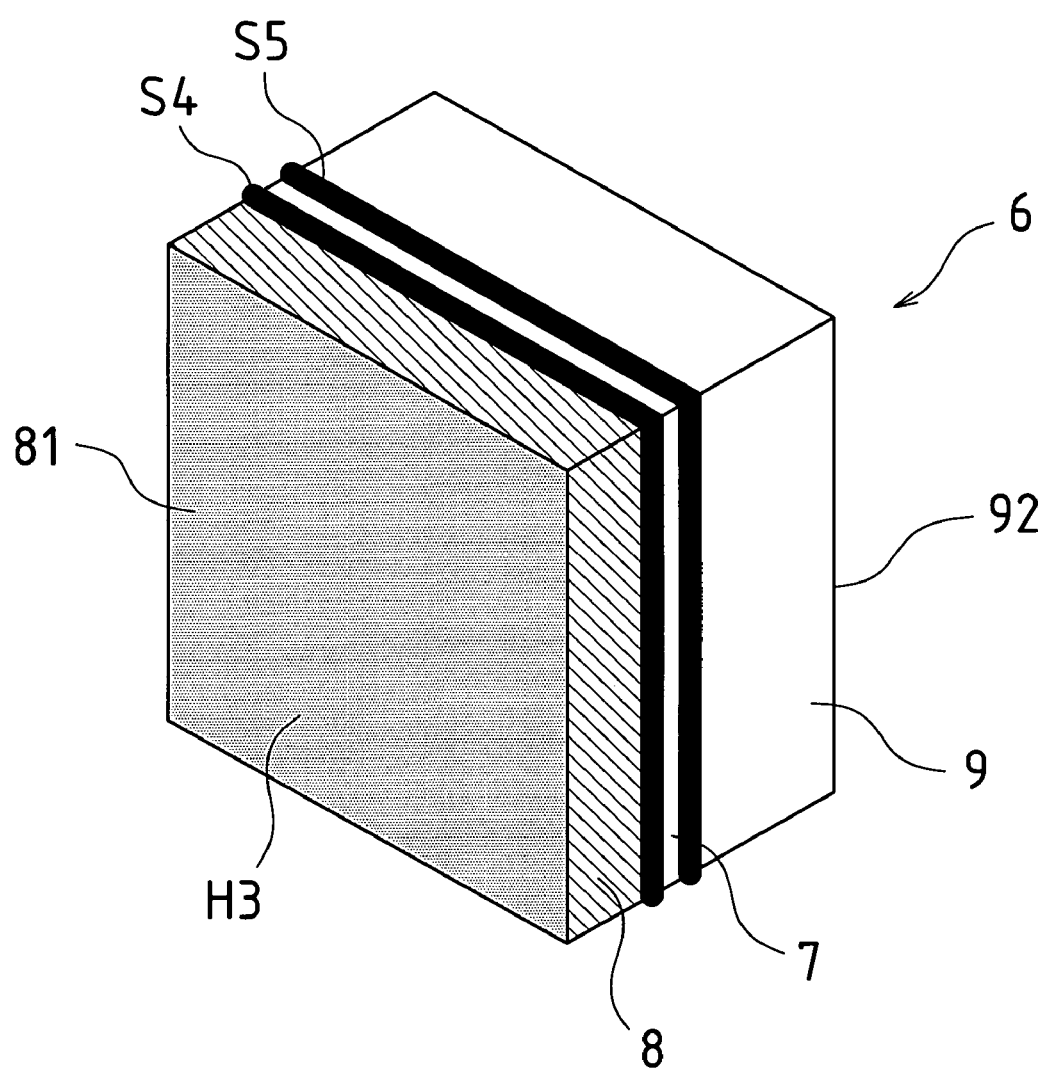
FIG. 5 is a perspective view of the assembled state in FIG. 4.
Figure 6:
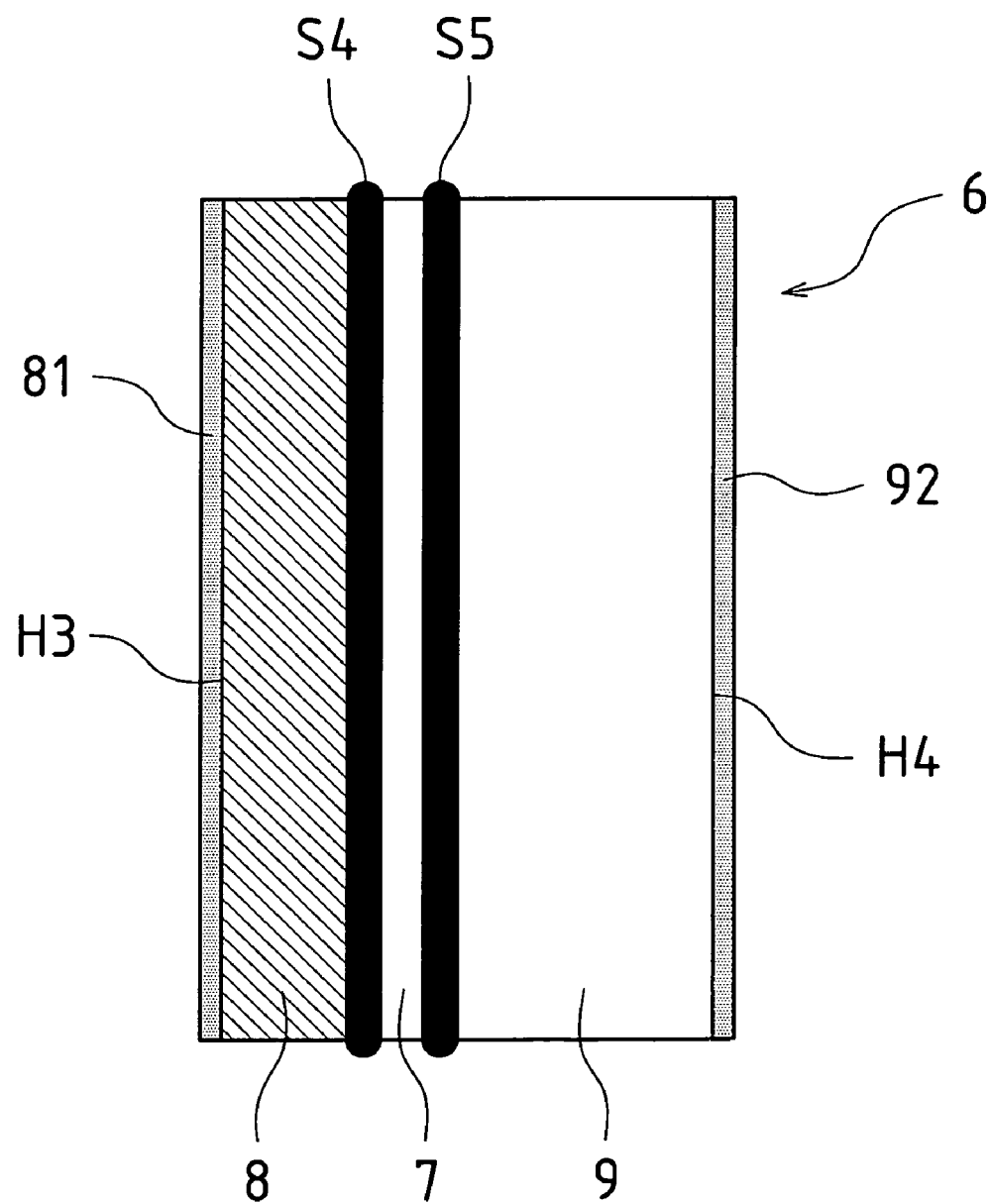
FIG. 6 is a side view of FIG. 5.

A second embodiment of the present invention will now be described, using an optical low pass filter as an example, through reference to the drawings. FIG. 4 is an exploded perspective view of the optical low pass filter according to this embodiment, FIG. 5 is a perspective view of the assembled state in FIG. 4, and FIG. 6 is a side view of FIG. 5.

As shown in these drawings, an optical low pass filter 6 is constituted by a crystal plate (optically anisotropic crystal plate) 7 and glass substrates 8 and 9. This will now be described in more specific terms. Here, the front side in FIGS. 4 and 5 (the left side in FIG. 6) shall be the incident face (referred to as the incident side end face in the present invention), the glass substrate that is in the front is called a first glass substrate, the back side (the right side in FIG. 6) shall be the exit face (referred to as the exit side end face in the present invention), and the glass substrate that is in the back is called a second glass substrate.

The crystal plate 7 (crystal double refraction plate) is square when seen in plan view. The crystal plate 7 has a thickness of 240 μm and an optical axis angle of 45° with respect to a reference plane (one side of a rectangular crystal plate). That is, the role of this crystal plate 7 is to separate light into an ordinary ray and an extraordinary ray in the 45° direction, and to filter aliasing noises. With this thin optical low pass filter, it is possible to reduce the separation width of the ordinary ray and extraordinary ray produced by double refraction so as to accommodate the smaller size and higher pixel counts of imaging elements such as CCDs. The optical axis of the crystal plate 7 is indicated by a solid line.

This embodiment is characterized in that the glass substrates 8 and 9, which are thicker than this optical low pass filter, are stuck to the front and back principal faces of the optical low pass filter in order to eliminate the effect of distortion in this thin optical low pass filter.

The first glass substrate 8 is substantially the same square shape as the crystal plate, and is made, for example, of colored glass having infrared-cut characteristics, such as phosphate glass, an infrared-cut coating (optical coating) H3 is formed on the incident face 81 of this first glass substrate, and the thickness is set to 800 μm. The second glass substrate 9 is substantially the same square shape as the crystal plate, and is made, for example, of siloca glass, sapphire glass, white glass, or the like, an antireflective film (optical coating) H4 is formed on the exit face 92 of the second glass substrate 9, and the thickness is set to 1500 μm. The above-mentioned infrared-cut coating and antireflective film can be obtained by forming multiple layers of $SiO_2$, $TiO_2$, or another such dielectric thin film by sputtering or another such method. The first glass substrate 8 is stuck onto the incident face 71 of the crystal plate 7 with a UV adhesive S4, and the second glass substrate 9 is stuck onto the exit face 72 of the crystal plate with a UV adhesive S5. Ion-assisted vapor deposition is another method for forming an infrared-cut coating or antireflective film. Ion-assisted vapor deposition allows an amorphously bonded infrared-cut coating or antireflective film to be formed. This "amorphous bonding" results in stronger stress in the infrared-cut coating or antireflective film, and in greater film strength. It also makes it possible to suppress change over time in the infrared-cut coating or antireflective film. Here, the infrared-cut coating or antireflective film is amorphously bonded by ion-assisted vapor deposition, but this is just a favorable example, and the method for forming an amorphously bonded infrared-cut coating or antireflective film is not limited to this. An $SiO_2$ dielectric thin film can be used favorably for the infrared-cut coating or antireflective film.

Since the glass substrates 8 and 9, which are thicker than the crystal plate, are stuck to the principal faces 71 and 72 at both ends of the crystal plate, no distortion occurs in the optical filter 6, and there is no change in the incidence angle, so the desired phase characteristics are obtained. Furthermore, these substrates not only increase the strength and rigidity of the optical filter 1, but also prevent the principal faces of the crystal plate from being scratched or chipped by external factors.

In the second embodiment given above, the example is of using a single crystal plate having an optical axis angle of 45°, and of two-point separation into an ordinary ray and an extraordinary ray in the 45° direction, but a separation pattern of four or more points may be employed using a plurality of crystal plates (only crystal double refraction plates, or a crystal double refraction plate and a quarter-wave plate). Also, in the above second embodiment, a decrease in optical transmissivity is suppressed by forming an infrared-cut coating on the incident face 81 of the first glass substrate, and an antireflective film (optical coating) only on the exit face 92 of the second glass substrate, which are end faces at both ends of the optical filter 6. However, an infrared-cut coating may also be formed on the other principal face of each glass substrate, or may be formed on the front and back principal faces of the crystal plates 2 and 3. In this case, the infrared-cut coating will be sandwiched on the inside, so the outer surface will not be scratched.

Next, an optical low pass filter according to the second embodiment above is manufactured in the desired dimensions and position conditions (see the following working examples), and working examples of this manufacture will now be described through reference to the drawings. The crystal plate A shown in the drawings and referred to in the following working examples is a double refraction plate with a double refraction of 0°, crystal plate B is a quarter-wave plate, substrate C is infrared-absorbent glass, crystal plate D is a double refraction plate with a double refraction of 90°, and substrate E is colorless glass.

WORKING EXAMPLE 1

Figure 7:
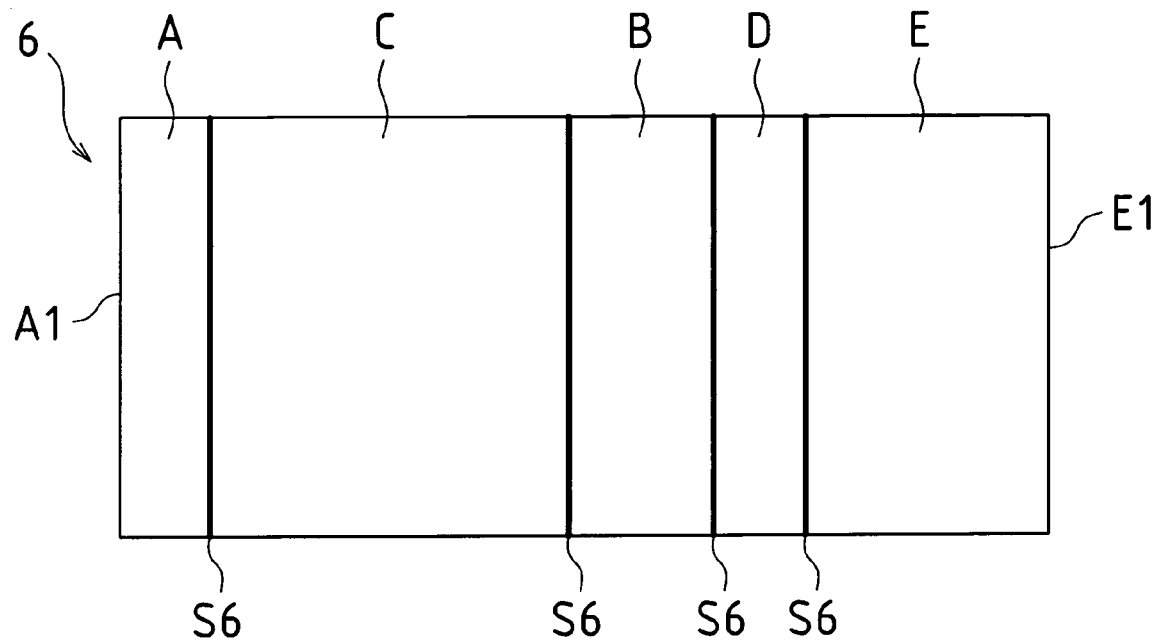
FIG. 7 is a side view of an optical low pass filter according to Working Example 1 of the present invention.

As shown in FIG. 7, the optical filter 6 according to this Working Example 1 includes the crystal plate A, the substrate C, the crystal plate B, the crystal plate D, and the substrate E stuck together, in that order from the left in the drawing, with a UV adhesive S6. The crystal plate A, the substrate C, the crystal plate B, the crystal plate D, and the substrate E here are disposed in an overlapping state. An antireflective film (optical coating) is formed on the exit side end face A1 of the crystal plate A, which corresponds to one side face of the optical filter 6. An infrared-cut coating (optical coating) is formed on the incident side end face E1 of the substrate E, which corresponds to the other side face of the optical filter 6.

With the optical filter 6 according to this Working Example 1, starting from the left side in FIG. 6, the thickness of the crystal plate A is set to 260 μm, the thickness of the substrate C is set to 1200 μm, the thickness of the crystal plate B is set to 350 μm, the thickness of the crystal plate D is set to 260 μm, and the thickness of the substrate E is set to 800 μm. The thickness of the UV adhesive S6 is set to 10 μm.

WORKING EXAMPLE 2

Figure 8:
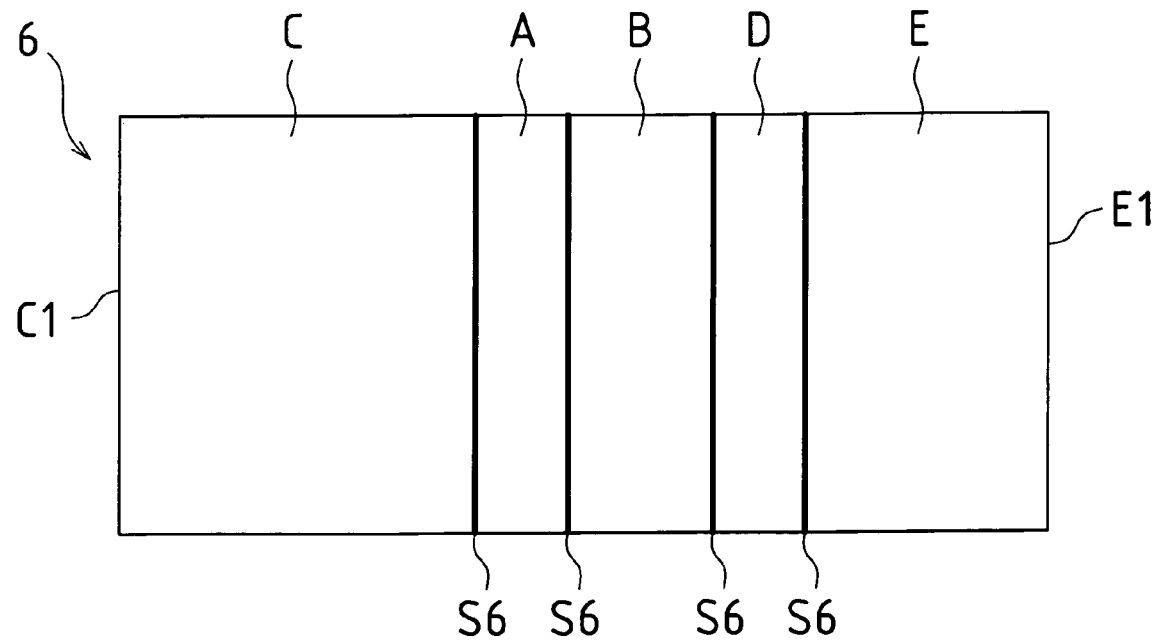
FIG. 8 is a side view of an optical low pass filter according to Working Example 2 of the present invention.

As shown in FIG. 8, the optical filter 6 according to this Working Example 2 includes the substrate C, the crystal plate A, the crystal plate B, the crystal plate D, and the substrate E stuck together, in that order from the left in the drawing, with the UV adhesive S6. The substrate C, the crystal plate A, the crystal plate B, the crystal plate D, and the substrate E here are disposed in an overlapping state. An antireflective film (optical coating) is formed on the exit side end face C1 of the crystal plate C, which corresponds to one side face of the optical filter 6. An infrared-cut coating (optical coating) is formed on the incident side end face E1 of the substrate E, which corresponds to the other side face of the optical filter 6.

With the optical filter 6 according to this Working Example 2, starting from the left side in FIG. 8, the thickness of the substrate C is set to 1200 μm, the thickness of the crystal plate A is set to 260 μm, the thickness of the crystal plate B is set to 350 μm, the thickness of the crystal plate D is set to 260 μm, and the thickness of the substrate E is set to 800 μm. The thickness of the UV adhesive S6 is set to 10 μm.

WORKING EXAMPLE 3

Figure 9:
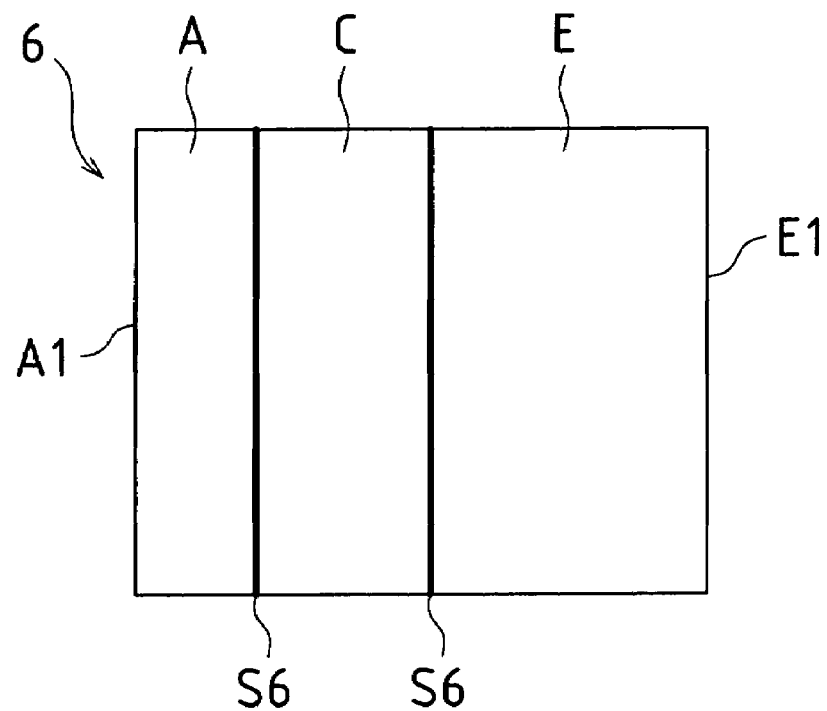
FIG. 9 is a side view of an optical low pass filter according to Working Example 3 of the present invention.

As shown in FIG. 9, the optical filter 6 according to this Working Example 3 includes the crystal plate A, the substrate C, and the substrate E stuck together, in that order from the left in the drawing, with the UV adhesive S6. The crystal plate A, the substrate C, and the substrate E here are disposed in an overlapping state. An antireflective film (optical coating) is formed on the exit side end face A1 of the crystal plate A, which corresponds to one side face of the optical filter 6. An infrared-cut coating (optical coating) is formed on the incident side end face E1 of the substrate E, which corresponds to the other side face of the optical filter 6.

With the optical filter 6 according to this Working Example 3, starting from the left side in FIG. 9, the thickness of the crystal plate A is set to 250 μm, the thickness of the substrate C is set to 500 μm, and the thickness of the substrate E is set to 950 μm. The thickness of the UV adhesive S6 is set to 10 μm.

WORKING EXAMPLE 4

Figure 10:
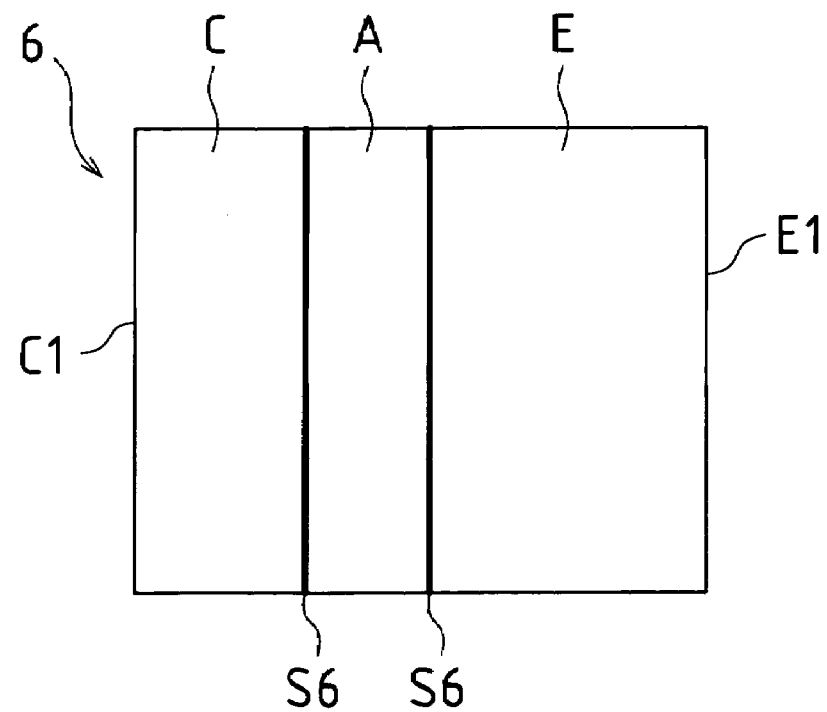
FIG. 10 is a side view of an optical low pass filter according to Working Example 4 of the present invention.
Figure 11:
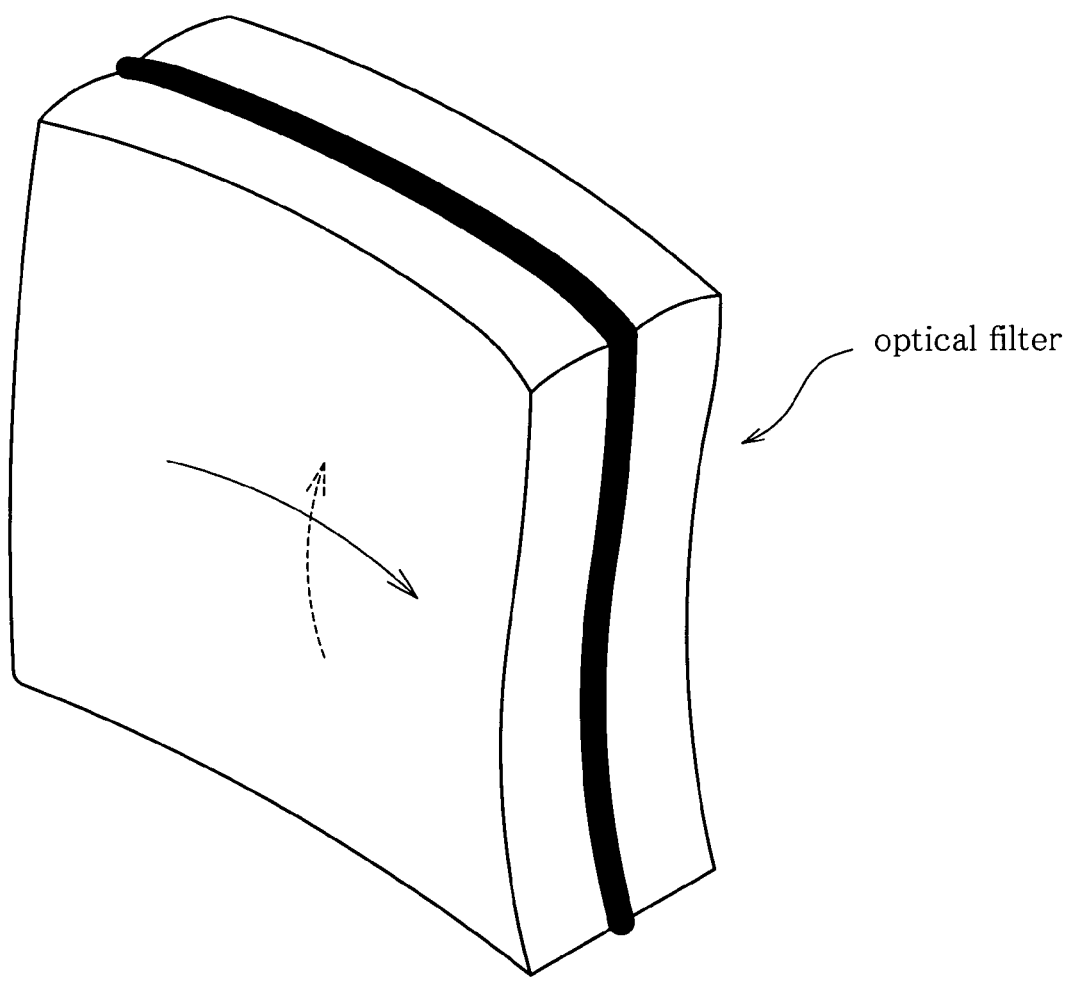
FIG. 11 is a perspective view illustrating problems encountered in the past.

As shown in FIG. 10, the optical filter 6 according to this Working Example 4 includes the substrate C, the crystal plate A, and the substrate E stuck together, in that order from the left in the drawing, with the UV adhesive S6. The substrate C, the crystal plate A, and the substrate E here are disposed in an overlapping state. An antireflective film (optical coating) is formed on the exit side end face C1 of the substrate C, which corresponds to one side face of the optical filter 6. An infrared-cut coating (optical coating) is formed on the incident side end face E1 of the substrate E, which corresponds to the other side face of the optical filter 6.

With the optical filter 6 according to this Working Example 4, starting from the left side in FIG. 10, the thickness of the substrate C is set to 500 μm, the thickness of the crystal plate A is set to 250 μm, and the thickness of the substrate E is set to 900 μm. The thickness of the UV adhesive S6 is set to 10 μm.

As shown in Working Examples 1 to 4 above, the thickness of the UV adhesive S6 is set to be no more than 1/20 the thickness of the crystal plates A, B, and D and substrates C and E. Setting the thickness of the UV adhesive S6 in this way prevents deformation in the thickness direction of the substrate or crystal plate that would otherwise occur in the bonding of the substrate or crystal plate. Furthermore, although the thickness of the UV adhesive S6 is set to be no more than 1/20 the thickness of each of the crystal plates A, B, and D and substrates C and E in Working Examples 1 to 4, it is not limited to this, and need only be set to no more than 1/20 the thickness of at least one of the crystal plates A, B, and D and substrates C and E. Specifically, the UV adhesive S6 may be set to a thickness that is no more than 1/20 the thickness of only the crystal plate A, for example. However, it is preferable for the UV adhesive S6 to be set to a thickness that is no more than 1/20 the thickness of each of the crystal plates A, B, and D and substrates C and E as in Working Examples 1 to 4 above.

In this Working Example 2, it is more preferable to use infrared absorbent glass C in Working Examples 1 to 4 above, in combination with an infrared-cut coating formed on the incident side end face E1 of the substrate E in order to cut out infrared rays.

Also, a colorless glass substrate E is used as the ray incident side end face in Working Examples 1 to 4 above, but the present invention is not limited to this, and a medium with a refractive index close to that of air may be used, and the substrate may be composed of crystal that is not anisotropic.

Also, a colorless glass substrate E is used as the ray incident side end face, and the crystal plate A (see FIGS. 7 and 9), or the substrate C (see FIGS. 8 and 10), is used as the ray exit side end face in Working Examples 1 to 4 above, but the present invention is not limited to this. For example, the ray incidence direction may be the opposite direction, the substrate E used as the ray exit side end face, and the crystal plate A (see FIGS. 7 and 9), or the substrate C (see FIGS. 8 and 10), used as the ray incident side end face.

Also, in Working Examples 1 and 3 above, the substrate E is used as the ray incident side end face, and either the crystal plate D (Working Example 1) or the substrate C (Working Example 3), both of which are thinner than the substrate E, is provided adjacent to the substrate E. Accordingly, the warping or distortion of the crystal plates by external factors such as heat, or the UV adhesive S6 or an optical coating, is suppressed, and warping or distortion caused by internal factors of the crystal plate itself, occurring due to variance in polishing precision or the like, is also corrected, affording better parallelism and flatness of the principal faces of the optical filter 6. In other words, the angle of incidence of a ray incident on a principal face of the optical filter 6 (and particularly the incident side end face E1) will not be changed by warping or distortion. Also, since warping or distortion will have no effect even if the crystal plate is made thinner, higher performance can be achieved.

Also, in Working Examples 2 and 4 above, the substrate E is used as the ray incident side end face, and either the crystal plate D (Working Example 2) or the crystal plate A (Working Example 4), both of which are thinner than the substrate C, is provided adjacent to the substrate E. Furthermore, the substrate C is used as the ray exit side end face, and the crystal plate (Working Examples 2 and 4), which is thinner than the substrate E, is provided adjacent to the substrate C. As discussed above, since there is no change in the incidence angle of the ray incident on the principal face of the optical filter 6 (and particularly the incident side end face E1), the desired phase characteristics and double refraction characteristics are obtained, and there is no adverse effect on optical characteristics. Furthermore, the warping or distortion of the crystal plates by external factors such as heat, or the UV adhesive S6 or an optical coating, is suppressed, and warping or distortion caused by internal factors of the crystal plate itself, occurring due to variance in polishing precision or the like, is also corrected, affording better parallelism and flatness of the principal faces C1 and E1 at both ends of the optical filter 6.

Other Embodiments

In the above embodiments, the description is of a case in which crystal is employed as the material constituting a phase plate and an optical low pass filter, but the present invention is not limited to this, and it is also possible to employ other optically anisotropic materials. Also, a case in which a glass substrate is employed as the substrate material is described, but the present invention is not limited to this, and a resin substrate or other transparent substrate may be used. In addition, the crystal plates and substrates are not limited to being square in shape, and may instead be another polyhedral shape or circular. Furthermore, an antireflective film or infrared-cut coating comprising alternating layers of $SiO_2$, $TiO_2$, or the like is given as an example of the optical coating, but other materials may be used instead, or another optical coating may be used, such as a UV-cut coating or an infrared-UV-cut coating.

The present invention can be worked in a variety of other configurations without deviating from the essence or principle characteristics thereof. Accordingly, the embodiments given above are in all respects merely examples, and should not be interpreted as being limiting. The scope of the present invention is defined by the claims, and is not restricted in any way by the text of this specification. Furthermore, modifications and changes belonging to equivalent claims are all encompassed by the scope of the present invention.

This application claims priority right on the basis of Patent Application 2003-420533 filed in Japan on Dec. 18, 2003, and the entire contents thereof are incorporated into this application by reference.

INDUSTRIAL APPLICABILITY

The present invention can be applied to a phase plate, an optical low pass filter, or the like that is used in any of various optical devices.

The invention claimed is:
1. An optical filter for varying the optical characteristics of a ray transmitted by an optically anisotropic crystal plate,
wherein at least one optically anisotropic crystal plate and at least one substrate are stuck together in a state in which a principal face of the optically anisotropic crystal plate and a principal face of the substrate are perpendicular to the direction of transmission of the ray,
the optically anisotropic crystal plate or the substrate is used as an end face on a ray incident side, and another optically anisotropic crystal plate or another substrate that is thinner than the optically anisotropic crystal plate or the substrate that is the end face on the ray incident side is stuck onto the optically anisotropic crystal plate or the substrate,
the optically anisotropic crystal plate and the substrate are stuck together with a UV adhesive, the thickness of the UV adhesive is no more than 1/20 the thickness of at least one of the optically anisotropic crystal plate and the substrate, and the optically anisotropic crystal plate and the substrate are respectively set to the thickness of at least 100 μm.

2. The optical filter according to claim 1, wherein an amorphously bonded optical coating is formed at least on the ray incident side end face or the exit side end face.

3. The optical filter according to claim 1, wherein the optically anisotropic crystal plate is a crystal plate, and the substrate is selected from the group consisting of a glass substrate, a resin substrate and a transparent substrate.

4. The optical filter according to claim 1, wherein the substrate is used for both end principal faces of the optical filter, and a portion of the substrate is given an optical coating.

5. The optical filter according to claim 1, wherein the substrate is used for both end principal faces of the optical filter, and these substrates have the same thickness.

6. The optical filter according to claim 1, which is a phase plate wherein a plurality of optically anisotropic crystal plates of different thickness are layered over one another, an incoming ray is split into an ordinary ray and an extraordinary ray, and the optical characteristics of the incoming ray are varied by a phase between these two rays.

7. The optical filter according to claim 1, which is an optical low pass filter wherein an incoming ray is split into an ordinary ray and an extraordinary ray by the optically anisotropic crystal plate, and the optical characteristics of the incoming ray are varied by imparting specific optical separation direction and specific separation width between these two rays.

8. An optical filter for varying the optical characteristics of a ray transmitted by an optically anisotropic crystal plate, wherein at least one optically anisotropic crystal plate and at least one substrate are stuck together in a state in which a principal face of the optically anisotropic crystal plate and a principal face of the substrate are perpendicular to the direction of transmission of the ray, the optically anisotropic crystal plate or the substrate is used as an end face on a ray exit side, and another optically anisotropic crystal plate or another substrate that is thinner than the optically anisotropic crystal plate or the substrate that is the end face on the ray exit side is stuck onto the optically anisotropic crystal plate or the substrate, the optically anisotropic crystal plate and the substrate are stuck together with a UV adhesive, the thickness of the UV adhesive is no more than 1/20 the thickness of at least one of the optically anisotropic plate and the substrate, and the optically anisotropic crystal plate and the substrate are respectively set to the thickness of at least 100 μm.

9. The optical filter according to claim 8, wherein an amorphously bonded optical coating is formed on at least the ray incident side end face or the exit side end face.

10. An optical filter for varying the optical characteristics of a ray transmitted by an optically anisotropic crystal plate, wherein at least one optically anisotropic crystal plate and at least one substrate are stuck together in a state in which a principal face of the optically anisotropic crystal plate and a principal face of the substrate are perpendicular to the direction of transmission of the ray, the optically anisotropic crystal plate or the substrate is used as an end face on a ray incident side, and another optically anisotropic crystal plate or another substrate that is thinner than the optically anisotropic crystal plate or the substrate that is the end face on the ray incident side is stuck onto the optically anisotropic crystal plate or the substrate, the optically anisotropic crystal plate or the substrate is used as an end face on a ray exit side, and another optically anisotropic crystal plate or another substrate that is thinner than the optically anisotropic crystal plate or the substrate that is the end face on the ray exit side is stuck onto the optically anisotropic crystal plate or the substrate.

the optically anisotropic crystal plate and the substrate are stuck together with a UV adhesive, the thickness of the UV adhesive is no more than 1/20 the thickness of at least one of the optically anisotropic crystal plate and the substrate, and the optically anisotropic crystal plate and the substrate are respectively set to the thickness of at least 100 μm.

11. The optical filter according to claim 10, wherein an amorphously bonded optical coating is formed at least on the ray incident side end face or the exit side end face.

* * * * *